E. THOMSON.
ELECTRIC METER.
APPLICATION FILED OCT. 10, 1914.

1,252,201.

Patented Jan. 1, 1918.
4 SHEETS—SHEET 1.

Witnesses:
Marcus L. Byng
J. Ell. Shu.

Inventor,
Elihu Thomson,
by Albert G. Davis
Att'y.

E. THOMSON.
ELECTRIC METER.
APPLICATION FILED OCT. 10, 1914.

1,252,201.

Patented Jan. 1, 1918.
4 SHEETS—SHEET 3.

Witnesses:

Inventor,
Elihu Thomson,
by Albert G. Davis
Att'y

E. THOMSON.
ELECTRIC METER.
APPLICATION FILED OCT. 10, 1914.

1,252,201.

Patented Jan. 1, 1918.
4 SHEETS—SHEET 4.

Witnesses:
Marcus B. Byng
J. Ellis Glen

Inventor,
Elihu Thomson,
by Albert G. Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRIC METER.

1,252,201.  Specification of Letters Patent.  Patented Jan. 1, 1918.

Application filed October 10, 1914. Serial No. 866,043.

*To all whom it may concern:*

Be it known that I, ELIHU THOMSON, a citizen of the United States, residing at Swampscott, county of Essex, State of Massachusetts, have invented certain new and useful Improvements in Electric Meters, of which the following is a specification.

My invention relates to electric meters and particularly to direct current electric meters. The invention more particularly relates to direct current electric meters of the motor type, and especially to such meters having an armature winding adapted to carry an electric current proportional to the voltage of an electrical installation and rotatably mounted within the magnetic influence of a field coil or coils adapted to carry an electric current proportional to the load current of the installation.

The object of my invention is to provide a novel and improved electric meter, and especially a novel and improved direct current electric motor meter. More particularly the object of my invention is to provide a simple, cheap, and easily repaired electric motor meter particularly adapted for use in direct current installations. Again, the object of my invention is to simplify and improve the construction of direct current electric motor meters, and to provide a meter of high initial and sustained accuracy, and of simple and cheap construction. Another object of my invention is to provide a novel and improved construction of electric motor meter in which the operative elements or working parts may be easily and conveniently assembled or disassembled, and are readily accessible for inspection, or repair. A further object of my invention is to provide a direct current electric motor meter having magnetic material in its armature, and preferably a magnetic core upon which the armature winding may be mounted or wound. Another object of my invention is to provide means for equalizing the effects upon the rotatable armature of an electric meter of the stray fields produced by a pair of permanent magnets, such as the damping magnets of the meter. Another object of my invention is to provide a novel type of supporting member or back for an electric meter. Other specific and detailed objects of my invention will be mentioned hereinafter and will be apparent to those skilled in the art by a perusal of the following description of an electric meter embodying my invention.

The novel features of my invention which I believe to be patentably characteristic thereof are definitely indicated in the claims appended hereto. These features of novelty together with the construction and operation of an electric meter embodying the same will be understood from the following description taken in connection with the accompanying drawings, in which,—

The meter illustrated in the drawings is a watthour meter of the type in which an armature adapted to carry an electric current dependent upon the potential of an electrical installation is rotatably mounted within the magnetic influence of field coils carrying the load current of the installation, or a definite fraction thereof. The armature is mounted upon a shaft carrying a suitable commutator, such, for example, as a commutator constructed of silver or its equivalent, as in the well-known Thomson recording wattmeter. The shaft also carries a suitable damping disk of copper, aluminum or other operatively equivalent metal, which is adapted to rotate between the poles of permanent damping magnets.

Heretofore, the presence of iron or other magnetic material in the armature of an electric meter of the type to which my invention relates has been carefully avoided in all practical forms of such meters. While certain attempts to employ magnetic material in the armature of such meters have, I believe, been made, as far as I am aware, no successful or practical electric meter having magnetic material in the armature has heretofore been devised. I have discovered, contrary to the present generally conceived ideas, that by selecting a good quality of iron and by a novel and improved armature construction which I have devised I may employ in a direct current motor meter a magnetic core in the rotatable armature. This core may be a solid ring of magnetic material, such as iron, but preferably, for convenience of construction, I make the magnetic core of a ring of laminations.

A second distinct feature of novelty of my present electric meter resides in the supporting base or back which carries all of the operative elements of the meter. As far as I am aware, metal, for example cast iron in certain instances, has heretofore been generally employed for the material of the supporting back of electric meters. In accordance with my present invention, I provide a supporting back of some ceramic brick-like material, such as cement, pottery, artificial stone, or other equivalent material which is an electrical insulating material and which is properly hardened. Such a supporting member may be inclosed in a metal binding or frame to protect its edges from breakage, although when the material of the member is sufficiently strong this binding can be left off. Supporting members, such as pillars or brackets, for the operative elements of the meter may be suitably cast in the refractory, non-conducting ceramic supporting back, or openings may be provided in the latter and the pillars or brackets anchored in their proper positions in such openings by self-hardening cement.

Another important feature of my present invention is a stray field equalizing device for the permanent damping magnets. This equalizing device consists of means acting in conjunction with the poles of the damping magnets for equalizing the effects of these magnets upon the rotatable armature of the meter and for preventing these magnets from exerting a direct influence on the torque or turning force of the meter armature. In electric meters having two permanent magnets coöperating with a damping disk and arranged with their respective poles on one side of the disk, if the magnets are of exactly equal strength and distribution of polarity, they have no influence in causing turning movement of the rotatable armature of the meter adjacent such respective poles. On the other hand if one magnet has more stray field than the other, or if the poles adjacent the rotatable armature are of unequal value, then an influence may be brought to bear on the armature, which produces a field tending to cause the armature to turn in one or the other direction. It is extremely difficult to obtain damping magnets which will have an equal effect upon the armature at a moderate distance away, and for this reason I have devised an equalizer for such magnets. The equalizer comprises a small piece of magnetic material placed near the poles of the two magnets which are adjacent the rotatable armature. The equalizer may assume a number of modified forms, in any one of which its object is to distribute or catch the stray field of one or both magnets and so balance or equalize the effects of such fields upon the armature, so as to neutralize the influence of both quantities upon the armature.

The meter of my present invention contains several other novel features which will be noted in detail hereinafter. The features of novelty of the invention together with the construction of an electric meter embodying such features will be best understood by specific reference to the accompanying drawings.

Figures 8, 9, 10, 11:
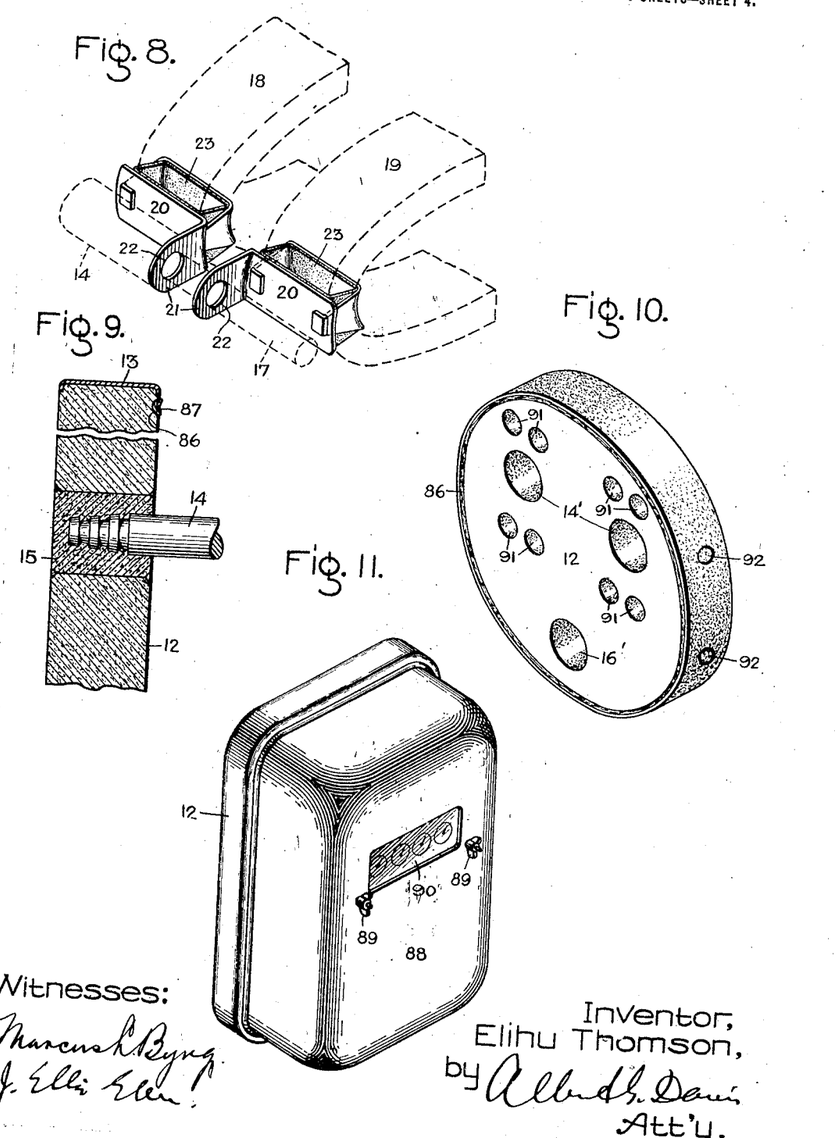
Fig. 8 is a detail perspective view illustrating my novel means for supporting the field coils of the meter.
Fig. 9 is a view of the preferred construction of a detail of the base or supporting back upon which the operative elements of the meter are mounted.
Fig. 10 is a view of the ceramic slab or supporting back which is made the support of the operative elements of the meter.
Fig. 11 is a view of the meter assembled and the parts covered, and having a rectangular slab or supporting back in place of the circular one shown in Fig. 10.

The operative elements of the meter are supported by a brick-like ceramic member 12. The member 12 is cast of a plastic composition of ceramic material, such, as cement, pottery, artificial stone, or concrete, which has good electrical insulating properties and which is reasonably hard when set. The ceramic supporting back may be cast in any desired shape, and may if necessary or desired be inclosed in a metal binding or frame 13 which protects the edges of the member from breakage. When the material of the ceramic member is sufficiently hard and strong the binding may be omitted. Supporting pillars, brackets, binding-posts and equivalent elements may be molded in the supporting member when the latter is made. Preferably, I mold the supporting member with suitable holes 14' and 16' for the principal supporting elements and secure these elements to the member by means of a self-hardening cement. Fig. 10 shows a molded or cast supporting back of ceramic material having holes 14' in which supporting posts 14 are adapted to be fixed by having their anchored ends embedded in a mass of self-hardening cement 15 filling the hole, as shown in Fig. 9. The securing of the supporting pillars, brackets and equivalent members to the ceramic member 12 after the latter has been made simplifies and cheapens the construction, and furthermore enables the use of a poorer electrical insulating material for the member 12, since the supporting pillars, brackets and equivalent elements may be sufficiently well insulated by using a good grade of cement to secure them to the member 12.

Two supporting pillars or posts 14 are firmly secured to the supporting member 12. A bracket 16 is similarly secured to the supporting member and these three elements support all of the working parts of the meter. The posts 14 have screw-threaded longitudinal holes at their outer ends in which are threaded supporting rods 17 of smaller diameter than that of the posts 14. The posts 14 and rods 17 carry the friction compensating or initial energy coil, the main field coils, the upper pivot bearing for the armature shaft, the ratio gearing and meter register, and the inclosing cover, as will be described in detail hereinafter. The bracket 16 carries the damping magnets and the lower pivot bearing for the armature shaft.

Figure 2:
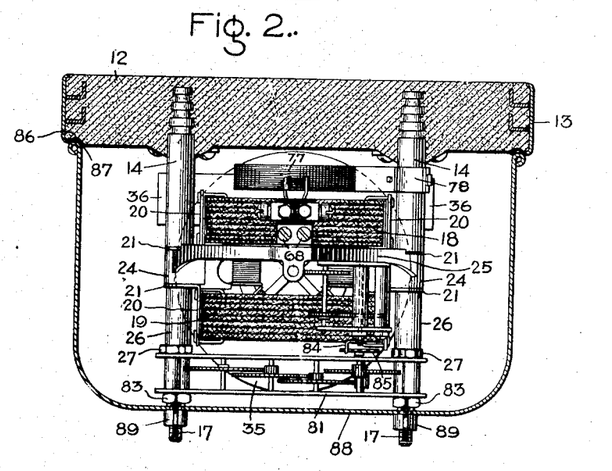
Fig. 2 is a top plan view of the meter for the most part in section.
Figure 3:
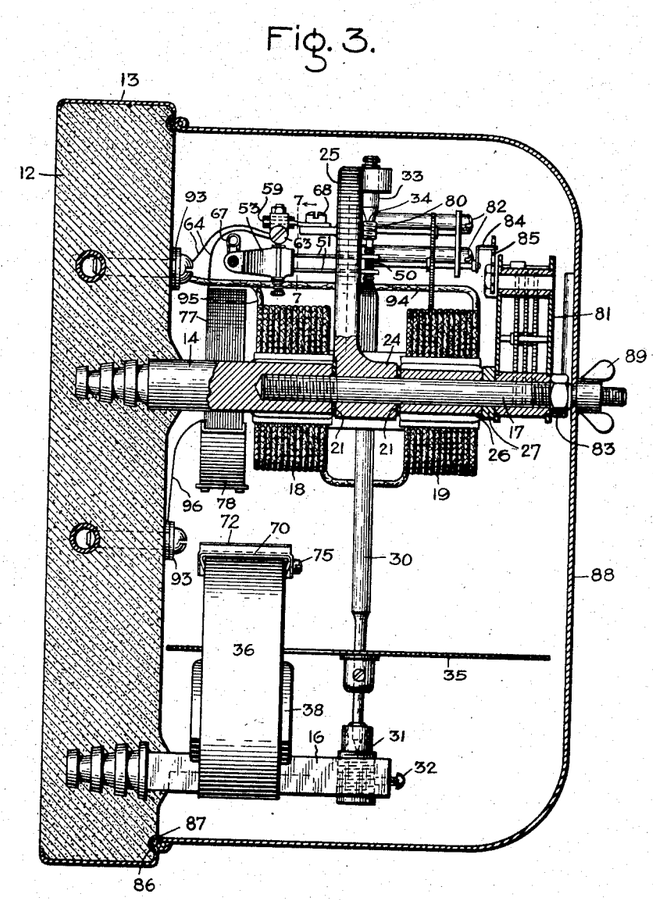
Fig. 3 is an end elevation of the meter also for the most part in section.
Figure 4:
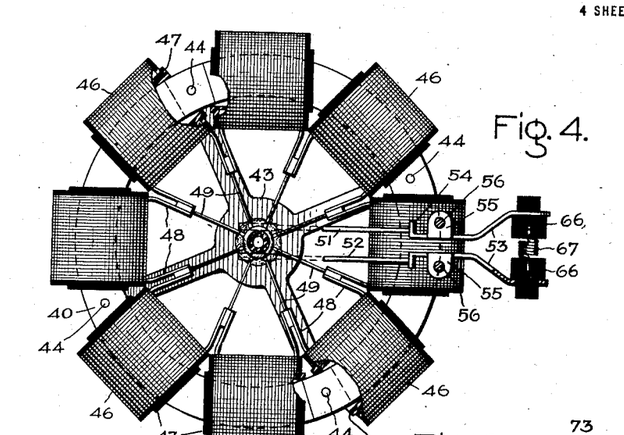
Fig. 4 is a plan view of the rotatable armature of the meter with certain parts partially broken away.

The field of the meter is produced by two oval field coils 18 and 19 designed to be connected in series relation with the electrical installation whose energy consumption is to be metered, and hence adapted to carry the load current of the installation, or a definite proportion of such current. In Fig. 8 of the drawings, I have illustrated the special construction and arrangement of supports which I have devised for mounting the field coils upon the rods 17. At each end of each oval coil is a metal clamp 20, suitably insulated from and secured to the coil and having an ear 21 extending therefrom. The ears 21 have holes 22 through which the rods 17 are adapted to extend. Each clamping support 20, as will be seen from an inspection of Fig. 8 of the drawings, is made up of a sheet metal strip bent at right angles to form the ear 21, and having two slots or openings through which the ends of a staple-like piece project and are clasped and clenched. The staple-like piece surrounds the curved end of the field coil and is insulated therefrom by a piece of insulating material 23. The rear field coil 18 is first strung on the rods 17 by means of the apertured ears 21, and is separated and suitably spaced from the front field coil, similarly mounted on the rods, by the legs 24 of a V-shaped bracket 25. The legs 24 are apertured and constitute in effect spacing sleeves to properly space the field coils 18 and 19, and are mounted on the rods 17 as indicated in Figs. 2 and 3 of the drawings. A spacing sleeve 26 is mounted on each rod 17 adjacent to the ear 21 of the clamping support of the front field coil 19, and nuts 27 serve to force the ears 21 of the field coil supports and the spacing sleeves 24 and 26 firmly together and against the shoulders formed by the posts 14.

The rotatable element of the meter comprises a shaft 30 mounted between suitable pivot bearings. The lower pivot bearing 31 for the shaft is mounted in a hole near the end of the bracket 16, and is adapted to be secured in position by a set screw 32. The upper pivot 33 for the shaft is mounted near the apex of the V-shaped bracket 25, and coöperates with a pivot bearing 34 carried at the upper end of the shaft 30. The shaft 30 carries near its lower end a damping disk 35 of the usual design positioned to rotate between the poles of permanent magnets 36. The magnets are secured to a non-magnetic yoke 38, which is adjustably mounted upon the bracket 16, so that the magnets may be moved away from or toward the shaft 30 for calibration of the meter in the usual manner.

Figures 5, 6, 7:
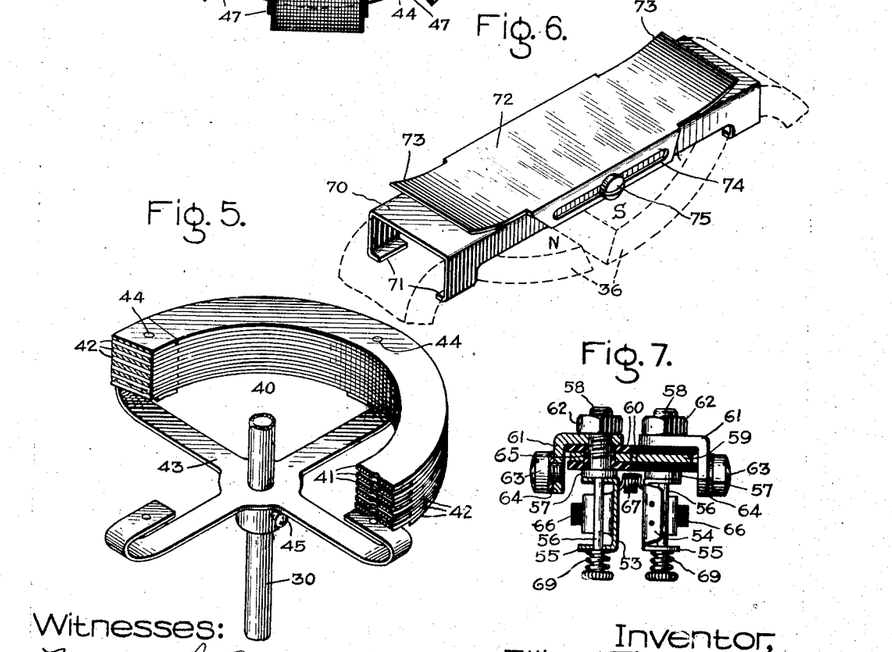
Fig. 5 is a detail perspective view illustrating the construction of the magnetic core of the armature.
Fig. 6 is a perspective view of my novel stray field equalizing device for the damping magnets of the meter.
Fig. 7 is a detail sectional view taken on the line 7—7 of Fig. 3.

The shaft 30 carries the armature winding of the meter, which in accordance with my present invention is mounted or wound upon a magnetic core. The armature winding is positioned within the magnetic influence of the field coils 18 and 19 and is designed to be connected across the electrical installation, and hence to carry a current dependent upon the voltage of the installation. I am not aware that any practical electric meter has heretofore been devised with magnetic material in the armature member. In accordance with my present invention the armature winding is mounted or wound upon an iron core 40. This iron core may be a solid ring of iron, but for convenience of construction I prefer to make the core of laminations. The core is preferably made in at least two sections, as indicated in Fig. 5 of the drawings. The two sections of the core are slightly more than semi-circular and are arranged to interleave or intermesh at their ends so as to give an overlap between the abutting ends, whereby the magnetic circuit is completed more effectively than if semi-circular sections were merely abutted in a single plane. The individual laminations of the core are semi-circular, and the laminations are so arranged that alternate laminations 41 project at one end beyond the other laminations 42, whereby the latter laminations 42 project at the other end beyond the first mentioned alternate laminations 41. The semi-circular or ring segment laminations are bound together and secured to a supporting spider 43 by means of bolts or pins 44. It will be seen from Fig. 5 of the drawings that the spider 43 has four arms, and that bolts or pins extend through the overlapping portions of the laminations to secure the laminations to two oppositely positioned arms of the spider. The spider is carried by the shaft 30 and is fixed thereto by means of a set screw 45. The spider 43 may be made of non-magnetic material, such as sheet aluminum.

The armature winding is arranged on the magnetic core before the two sections of the core are interleaved and fastened together. The armature winding is preferably in the form of a plurality of coils or spools 46 of very fine wire. The armature spools have an insulating central sleeve 47 through which the iron core 40 extends and upon which the fine wire of the spool is wound. Each spool has a very large number of turns of very fine insulated wire. The individual coils or spools are connected in series, as in the well known ring armature, and to this end the spools are provided with terminals 48, and the adjacent terminals of adjacent spools are electrically connected together, and electrical connections 49 from these points of union are made to the separate segments of a commutator 50 positioned above the armature member.

The construction of the armature in a plurality of independent coils is particularly advantageous, since it is a comparatively simple matter to take apart the structure and introduce a new coil, if any of the fine wire coils is defective or becomes injured. This is quite an important feature in meters where the wire is as fine as in the meter of my present invention, since such fine wire is inherently subject to injury or defect. Instead, therefore, of sacrificing the whole of the meter armature, as is ordinarily done at the present time in meters of this general type, a repair can be readily effected and injured parts conveniently and quickly supplied for remedying such defects as may occur.

Two pairs of brushes 51 and 52 operatively bear upon diametrically opposite sides of the commutator 50 in the well known manner. The brushes themselves, are, as usual, in meter construction, small wires extending from suitable carriers or brush supports, and are preferably tipped with silver at those portions which rest or bear upon the commutator. The construction of the brush support will be understood by reference to Figs. 2, 3, 4, and 7 of the drawings. Each pair of brushes is mounted in a brush carrying lever 53. These brush carrying levers are made of sheet metal bent to provide a brush-attaching member 54 and pivoting ears 55. The pivoting ears 55 have apertures through which extend stationary pivot pins 56, there being one pivot pin for each brush support. The ears 55 of the brush-carrying levers 53 are strung on the pins 56 and are forced against flanges 57 of the pins by small springs 69, whereby a good electrical contact between the flange and the coöperating brush carrying lever is made. The brush carrying levers and the brushes may be swung around the pins 56 as pivots through a limited angle in a horizontal plane. The upper end of each pin 56 is provided with the flange 57 and a bolt 58, both preferably integral with the pin. The bolts 58 extend through openings in a plate 59, and each bolt is suitably insulated from the plate by an insulating bushing 65 which surrounds the bolt and projects beyond the surfaces of the plate and by strips 60 of insulating material placed on the top and bottom surfaces of the plate and having openings through which the bolts and bushings extend. A bent sheet metal member 61 is carried by each bolt 58, and the pin 56, insulating strips 60, plate 59 and member 61 are securely fastened together by a nut 62 threaded on the bolt. The members 61 serve as binding-posts and carry a binding screw 63 for securing conductors 64 to the member, whereby the conductors are electrically connected to the pairs of brushes 51 and 52 and thence to the armature winding. The plate 59 is secured to a rearwardly extending projection on the V-shaped bracket 25 by screws 68, as clearly shown in Figs. 2 and 3 of the drawings.

The brush carrying levers 53 are provided at their rear ends with openings in which are positioned insulating plugs 66. A spring 67 is secured between the plugs 66 and acts to force the plugs apart, as will be evident from an inspection of Fig. 4. The spring 67 thus acts to force the inner ends of the levers 53 toward each other, whereby the brushes are lightly held against the commutator. The tension of the spring 67 is so adjusted that its action is just sufficient to give the light contact required between the brushes and the commutator without producing undue friction at the surface of the commutator. This common spring for the two pairs of brushes insures equal pressures of the brushes on the commutator, and consequently there is no lateral thrust on the shaft which would cause friction in the shaft pivots.

Figure 1:
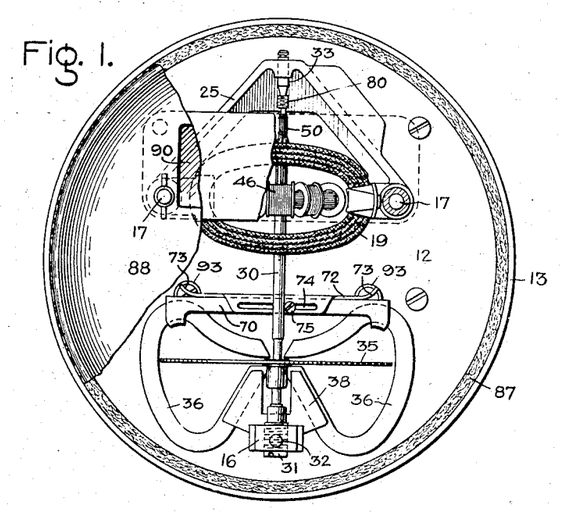
Figure 1 is a front elevation of an electric meter embodying my invention, with the cover and register partly broken away to show more clearly the working elements of the meter.

In electric meters of the general type to which my invention relates, where there are two magnets applied to the damping disk and in which these magnets are constructed with their respective poles, that is north and south poles, above the disk, the magnets have no influence in causing turning movement on the meter armature, positioned above, if the magnets are of exactly equal strength and distribution of polarity. If, however, one magnet has more stray field than the other, or if the upper poles are of unequal value, then an influence may be brought to bear on the armature above, which produces a field tending to cause the armature to turn in one or the other direction. It is difficult to arrange or obtain damping magnets which will have an equal effect on the armature at a moderate distance away, and I have, accordingly, provided an equalizer for equalizing the effects of the stray field magnetism of the damping magnets upon the meter armature. The principle of operation of the equalizer and the details of its construction and its operative relation to the damping magnets and armature will be understood by reference to Figs. 1, 3 and 6 of the drawings.

Referring first to Fig. 6 of the drawings, I have designated, by way of example, the polarities of the upper poles of the damping magnets 36, shown in dotted lines, by reference numerals N and S. I strap upon the magnets, as by a piece of zinc suitably bent, a device constructed of magnetic material, such as iron, and which I have designated an equalizer. In the drawings, I have shown a member of sheet zinc 70 having at its ends bent toes 71 adapted to be clamped under the bends of the magnets, as clearly shown in Fig. 6. The bent clamping toes keep the zinc member 70 in place, though it is not required that this member be very firmly held. While I have designated a member of zinc, it will of course be understood that any suitable non-magnetic material may be employed, and I have merely mentioned a member of zinc because zinc is particularly applicable on account of its pliability and cheapness. The non-magnetic member 70 has mounted on and above it at a little distance away from the magnets a sheet of soft iron 72, preferably having upturned ends 73, though the latter feature is not necessary. The magnetic member or equalizer 72 has a bent portion on one side provided with a slot 74 through which extends a set screw 75 operatively threaded in the side of the non-magnetic member 70. The position of the magnetic equalizer may thus be adjusted in a horizontal direction so that it may project more over one of the magnets than the other if need be.

The magnetic member 72 is truly an equalizer, and by adjusting its position from right to left or by swinging its ends up and down respectively all the effects of stray fields from the magnets can be balanced. The magnets 36, as indicated in Fig. 6, present on the upper side north and south poles respectively, but of course, these poles are usually not distributed evenly or of the same value, hence there is a tendency to stray field, especially when the magnets are near enough to the armature of the meter. It is most desirable not to have the magnets too far away from the armature in order not to have the shaft too long. By simply adjusting the position of the equalizer with respect to either or both of the magnets, we can, as it were cause a preponderance of north effect or south effect on the revolving armature and consequently balance the effect of a strong north pole as against a weaker south pole, or of a strong south pole as against a weaker north pole, so that by reversing the current through the whole meter there is no difference in the rate of revolution. Inasmuch as these meters are installed without reference to any particular direction of current flow through them, the advantage from the use of the equalizer is valuable and important.

A specific example will assist further in clearly understanding the function and operation of the equalizer. If the damping magnets are equal in strength or equal in stray field, the equalizer is bent symmetrically with respect to the magnets, or positioned at equal distances therefrom. If the left hand magnet 36N of Fig. 6 has a greater influence on the revolving armature or causes more leakage effect than the right hand magnet 36S, as shown by the tendency of the armature to turn in a given direction, then the equalizer would be moved to the right away from the magnet 36N and nearer to the magnet 36S so as to balance the preponderating influence of the magnet 36N by an addition of magnetic influence inductively communicated from the magnet 36S. If on the other hand, the right hand magnet 36S is shown, by the tendency of the armature to revolve in the opposite direction, to be superior in effect upon the armature to the left hand magnet 36N, then the equalizer is moved toward the left, or away from the magnet 36S and toward the magnet 36N, so as to give the magnet 36N a preponderating effect on the armature. Numerous modifications in the construction of the equalizer will be apparent to those skilled in the art. Instead of sliding the equalizer sidewise its end might be tilted upward more or less, by bending for example. The object of the equalizer is, as it were, to distribute or catch the stray field from one or both the magnets and so balance or equalize the influence of both quantities upon the meter armature. The equalizer might, therefore, be properly described as a means acting in conjunction with the magnet poles (36N and 36S) equalizing their effects on the armature of the meter and preventing their having a direct influence on the torque or turning force of the meter.

The friction compensating or initial energy coil 77 of the meter is mounted upon the right hand post 14, viewing the meter from the front, as shown in Figs. 2 and 3 of the drawings. The coil 77 is secured to a clamp 78 having at one end a hub mounted on the post 14 and adapted to be secured thereto by a suitable set nut. The coil can be moved horizontally by sliding the clamp along the post, and can be moved vertically by swinging the clamp around the post as a pivot. The initial energy coil is designed, as usual, to carry a current dependent upon the voltage of the installation.

The meter shaft 30 carries at its upper end, as is usual in electric motor meters, a worm 80 which engages with a worm wheel connected by suitable ratio gearing to the meter register 81. The ratio gearing between the worm 80 and the register 81 is carried by a frame secured to the V-shaped bracket 25 by bolts 82, as clearly shown in Figs. 2 and 3 of the drawings. The meter register 81 is mounted on the rods 17 adjacent to the bolts 27 and is securely maintained in position by nuts 83 threaded on the rods. A dog 84 is connected to the last gear of the ratio gearing and extends between two adjacent teeth of a sprocket wheel 85, and thereby operatively connects the ratio gearing to the gear train of the meter register.

The supporting back 12 of the meter has a groove 86 near its outer edge in which is cemented a piece 87 of felt or similar material. A sheet metal cover 88 has its inner edge resting against the strip of felt 87 to form a dust and insect tight joint and is mounted upon the rods 17 and maintained in position by wing nuts 89. The cover 88 carries a glass window 90 of the usual construction through which the dials of the register may be seen.

While the figures of the drawings generally show the ceramic, electrically non-conducting supporting back of circular configuration, this is, of course, not necessary since the supporting back may be made of any desired configuration, as in Fig. 11, which shows a substantially rectangular back with the inclosing cover of the meter in position. While I prefer to employ a supporting back of ceramic material, it will of course be understood that certain features of my present invention are entirely independent of the character of the supporting back of the meter, and as to such features I wish it to be understood that the meter back may be made of metal, as at present generally done, or of any other suitable material.

The terminal construction of the meter will be understood by reference to Figs. 2, 3 and 10 of the drawings. The supporting back 12 is provided with four pairs of openings 91 in its front face and two transverse openings 92 on each side. Suitable metallic terminals 93 are molded in the holes in the supporting back, or may be mounted in the holes in any desired manner. The two terminals in each pair of holes 91 are electrically connected in the usual manner. The line conductors are adapted to extend through the openings 92 on one side of the meter and to be secured to the nearest terminals 93, while the load conductors are adapted to extend through the openings 92 at the other side of the meter and to be secured to the terminals nearest this side. Conductors 94 and 95 connect the field coils 18 and 19, themselves connected in series, between the inner terminals of the top pair of terminals 93. Conductors 64 and 96 connect the brush terminals 61, and hence the armature winding, and the initial energy coil 77 in series with each other and between a terminal 93 in the top row and a terminal 93 in the bottom row.

It is believed that the operation of the meter will be understood from the foregoing description. It will be observed that the construction is extremely simple and that the assembly of the parts may be easily and readily effected. Three posts support all of the meter parts, and these parts may be assembled or disassembled in a simple and convenient way. The meter is smaller in size than any present direct current meter of which I am aware. This reduction in size of the meter is accomplished by the use of iron or magnetic material in the armature. The use of iron increases the torque of the meter, and consequently the necessary meter torque can be obtained with a smaller armature and a smaller shunt current. The smaller armature construction is accompanied by increased efficiency, shortening of the field coils, and, in general, an all around reduction in the dimensions of the various parts of the meter.

I believe the practical use of magnetic material in the armature of an electric meter to be distinctly novel, and the advantages resulting from such a construction are evident. I am aware that attempts to use iron have heretofore been made, but I believe that no practical or commercially satisfactory meter has heretofore been produced with iron in the meter armature. The novel arrangement of the armature winding which I employ in my present meter enables me to use an iron core for the armature winding. The coils or spools are wound of a very large number of turns of very fine wire, and the concentration of the magnetic flux produced by such coils produces definite salient poles in the magnetic core at right angles to the poles produced by the field coils. Due to the concentration of the magnetic flux producing these definite armature poles, occasioned by the form of armature winding which I employ, the poles produced by the armature winding overcome or suppress the poles in quadrature therewith produced by the field coils under light loads, so that the effect of the armature produced poles is dominating. As the load increases the current in the field coils increases and the magnetism of the armature winding is more and more dominated by that of the field coils, until at high loads the resultant magnetization of the armature core is almost in line with the axis of magnetization of the field coils. The armature core is thus in effect a permanent magnet having an axis of magnetization determined by the ratio of the strength of the magnetism of the field or current coils to that of the armature or potential coils. The armature therefore tends to turn, just as any permanent magnet so positioned in a magnetic field tends to turn. An additional tendency to turn is further produced by the flow of current in the armature conductors located in the magnetic field produced by the field coils in the well understood manner. The meter registry is made sufficiently accurate for all practical purposes by confining the full load excitation of the field coils 18 and 19 to such an amount as will not oversaturate or render inert the capacity of the magnetic armature core 40 to receive the increase or additional magnetic effect upon an increase in load up to full load.

Another important advantage resulting from the use of iron in the armature of the meter of my present invention is that it prevents creeping of the movable element. Under small torque-producing influences the armature tends to hold itself still, and only begins to turn when a certain turning force is developed. This is, I believe, due to the hysteretic effect of the iron refusing to have its magnetism shifted unless the force is sufficiently great to do it. Meters embodying the iron armature of my invention are thus peculiarly free from what is known as "creep."

I have explained my invention by illustrating and describing a certain specific embodiment thereof, but it will be readily understood by those skilled in the art that the invention may be embodied in many other forms than that shown and described. I, accordingly, do not wish to be restricted to the particular form and construction disclosed herein by way of example for the purpose of setting forth my invention in accordance with the patent statutes. The terms of the appended claims are, therefore, not restricted to the precise structure disclosed but are intended to cover all changes and modifications within the spirit and scope of my invention.

What I claim as new and desire to secure by Letters Patent of the United States, is:—

1. In an electric meter, a supporting back, two supporting members secured to said supporting back, a rotatable armature, two field coils mounted on said supporting members, a bracket mounted on said supporting members in a plane between said field coils, and a pivot bearing for said armature carried by said bracket.

2. In an electric meter, a supporting back, two supporting members secured to said supporting back, a rotatable armature, two field coils mounted on said supporting members, a bracket mounted on said supporting members in a plane between said field coils, a register mounted on said supporting members adjacent one of said field coils, and a ratio gearing mounted on said bracket and operatively connecting said armature and said meter register.

3. In an electric meter, a supporting back, two supporting members secured to said supporting back, a rotatable armature, two field coils mounted on said supporting members, a bracket mounted on said supporting members in a plane between said field coils, a pivot bearing for said armature carried by said bracket, a meter register mounted on said supporting members, and ratio gearing mounted on said bracket and operatively connecting said armature and said meter register.

4. In an electric meter, a supporting back, two supporting members secured to said supporting back, a rotatable shaft, an armature winding and a coöperating commutator carried by said shaft, two field coils mounted on said supporting members, a bracket mounted on said supporting members in a plane between said field coils, and commutator brushes carried by said bracket.

5. In an electric meter, a supporting back, two supporting members secured to said supporting back, a rotatable shaft, a magnetic core carried by said shaft, an armature winding carried by said core, a commutator electrically connected to said armature winding and carried by said shaft, two oval field coils mounted on said supporting members, a bracket mounted on said supporting members in a plane between said field coils, and commutator brushes carried by said bracket.

6. In an electric meter, a supporting back, two supporting members secured to said supporting back, a rotatable armature, two field coils mounted on said supporting members, a bracket mounted on said supporting members in a plane between said field coils, a meter register mounted on said supporting members adjacent one of said field coils, ratio gearing mounted on said bracket and operatively connecting said armature and said meter register, a pivot bearing for said armature carried by said bracket, a third supporting member secured to said supporting back, and damping magnets and a second pivot bearing for said armature mounted on said third supporting member.

7. In an electric meter, a supporting back, two supporting members secured to said supporting back, a rotatably mounted shaft carrying an armature winding and a damping disk, two field coils mounted on said supporting members, a bracket mounted on said supporting members in a plane between said field coils, an initial energy coil mounted upon one of said supporting members, a pivot bearing for said shaft carried by said bracket, a meter register mounted on said supporting members, ratio gearing mounted on said bracket and operatively connecting said shaft and said meter register, a third supporting member secured to said supporting back, and dam ng magnets operatively related to said disk and a second pivot bearing for said shaft each mounted on said third supporting member.

8. In an electric meter, a supporting back, two supporting members secured to said supporting back, a field coil, and clamps having an ear with an aperture therein secured to said field coil, apertures of said clamps operatively eng ing said supporting members.

9. In an elect c meter, a supporting back, two supporting members secured to said supporting back, an oval field coil, and a sheet metal clamp having an ear with an aperture therein secured at each end of s id coil, the apertures of said clamps operat ly engaging said supporting members.

10. In an electric meter, a supporting back, a supporting member secured to said supporting back, a field coil, and a sheet metal clamp comprising a strip having an ear with an aperture therein and a staple-like member surrounding an end of said coil and secured to said strip, the apertures in said ear operatively engaging said supporting member.

11. In an electric meter, a supporting back, two supporting members secured to said supporting back, two oval field coils, a metal clamp secured at each end of each field coil and mounted on said supporting members, and a spacing sleeve mounted on each supporting member between the clamps mounted on such supporting member.

12. In an electric meter, a rotatable armature, a pair of permanent magnets presenting respectively poles of opposite polarity toward said armature, and magnetic means equalizing the effects of the two magnets upon the armature.

13. In an electric meter, a rotatable armature, a pair of permanent magnets presenting respectively poles of opposite polarity toward said armature, and a magnetic equalizer adapted to equalize the effects upon the armature of the stray fields of the magnets.

14. In an electric meter, a rotatable armature, a pair of permanent magnets presenting respectively poles of opposite polarity toward said armature, and a magnetic member positioned between the armature and the magnets and adapted by an addition of magnetic influence communicated from one magnet to the other to balance the effects of the stray fields of the magnets upon the armature.

15. In an electric meter, a rotatable armature, a pair of permanent magnets presenting respectively poles of opposite polarity toward said armature, a non-magnetic member secured to said magnets, and a magnetic member supported by said non-magnetic member in a position between the magnets and the armature and adapted to equalize the effects of the two magnets upon the armature.

16. In an electric meter, a rotatable armature, a pair of permanent magnets presenting respectively poles of opposite polarity toward said armature, a non-magnetic member secured to said magnets, a magnetic member supported by said non-magnetic member in a position between the magnets and the armature and adjustable in a horizontal direction toward and away from the two magnets respectively, and means for securing the magnetic member to the non-magnetic member.

17. In an electric meter, a rotatable armature, a pair of permanent magnets presenting respectively poles of opposite polarity toward said armature, a non-magnetic sheet metal member clamped to said magnets, a soft iron member supported by said non-magnetic member and adjustable in a horizontal direction toward and away from the two magnets respectively, and means for securing the iron member to the non-magnetic member.

In witness whereof, I have hereunto set my hand this eighth day of October, 1914.

ELIHU THOMSON.

Witnesses:
JOHN A. MCMANUS, Jr.,
ROBERT SHAND.